(12) United States Patent
Clark et al.

(10) Patent No.: US 8,280,704 B2
(45) Date of Patent: Oct. 2, 2012

(54) CHARACTERISATION OF SOFT BODY IMPACTS

(75) Inventors: Daniel N S Clark, Derby (GB); Duncan A S Macdougall, Derby (GB); Julian M Reed, Derby (GB)

(73) Assignee: Rolls-Royce PLC, London (GB)

( * ) Notice: Subject to any disclaimer, the term of this patent is extended or adjusted under 35 U.S.C. 154(b) by 674 days.

(21) Appl. No.: 12/382,936

(22) Filed: Mar. 26, 2009

(65) Prior Publication Data

US 2011/0178780 A1    Jul. 21, 2011

(30) Foreign Application Priority Data

Apr. 25, 2008  (GB) .................................. 0807482.5

(51) Int. Cl.
*G06F 7/60* (2006.01)
*G06F 17/10* (2006.01)
(52) U.S. Cl. .......................................................... 703/2
(58) Field of Classification Search ........................ 703/2
See application file for complete search history.

(56) References Cited

U.S. PATENT DOCUMENTS

2007/0231153 A1* 10/2007 Beckford et al. ......... 416/229 R

FOREIGN PATENT DOCUMENTS

| JP | A-8-61086 | 3/1996 |
|---|---|---|
| SU | 486245 | 1/1974 |
| WO | WO 2007/112511 A1 | 10/2007 |

OTHER PUBLICATIONS

Nizampatnam, Lakshmi S., "Models and Methods for Bird Strike Load Predictions", Dec. 2007, Department of Aerospace Engineering, Wichita State University, pp. (26, 96-98, 103).*
Reed, Julian M. "Further Discussion of Bird Strike Design Issues for Engines with Obscured Fans", 2007, 2007 Bird Strike Committee USA/Canada, 9th Annual Meeting, Kingston, Ontario.*
Frischbier, Joerg et al. "Multiple Stage Turbofan Bird Ingestion Analysis with Ale and SPH Methods", 2005, American Institute of Aeronautics and Astronautics Inc.*
Jenq, S.T. et al. "Simulation of a Rigid Plate Hit by a Cylindrical Hemi-Spherical Tip-Ended Soft Impactor", Aug. 4, 2006, Elsevier B.V.*
Sanchez-Pena, Jose M. et al., "Cost-Effective Optoelectronic System to Measure the Projectile Velocity in High-Velocity Impact Testing of Aircraft and Spacecraft Structural Elements", May 2007, Optical Engineering, vol. 46 (5).*

* cited by examiner

*Primary Examiner* — Kandasamy Thangavelu
*Assistant Examiner* — Cedric D Johnson
(74) *Attorney, Agent, or Firm* — Oliff & Berridge, PLC

(57) ABSTRACT

The fragmentation of a bird or similar soft body, following its impact on an angled target plate, is modeled by representing the body as a combination of fragments and slurry, their relative proportions depending on the severity and angle of impact. The method is particularly suitable for modeling the behavior of a bird striking an obscuring intake of a gas turbine engine.

7 Claims, 6 Drawing Sheets

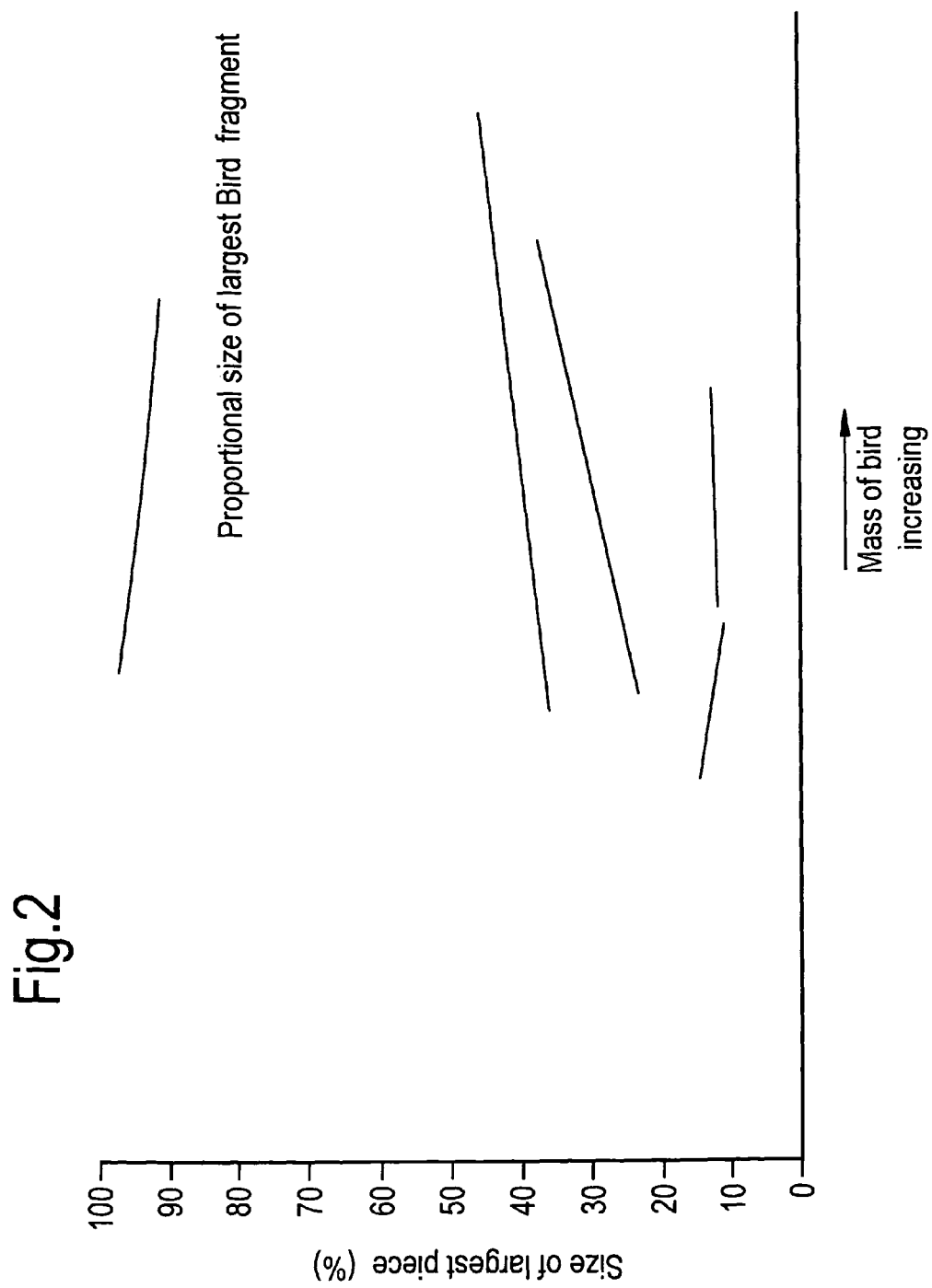

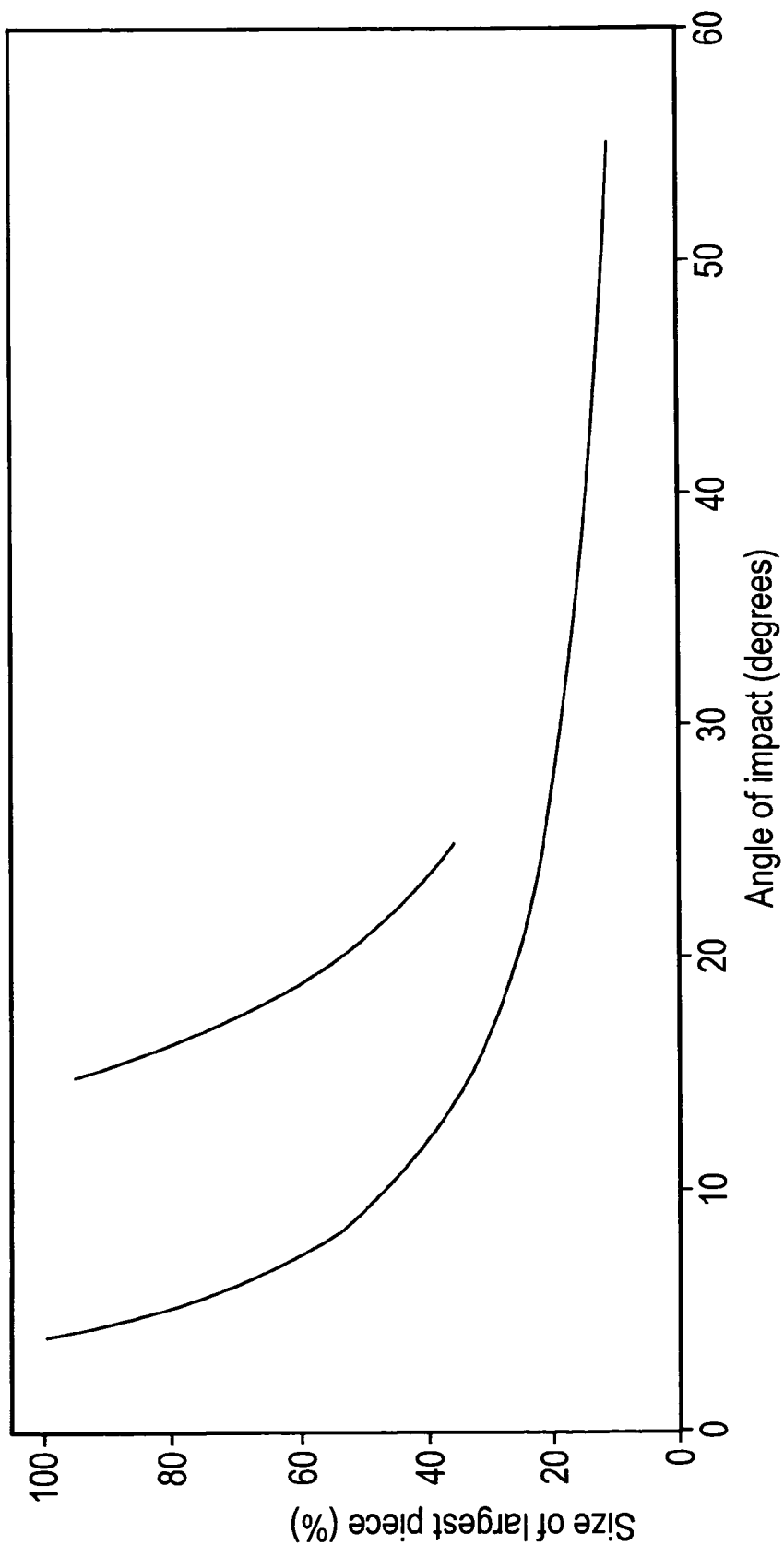

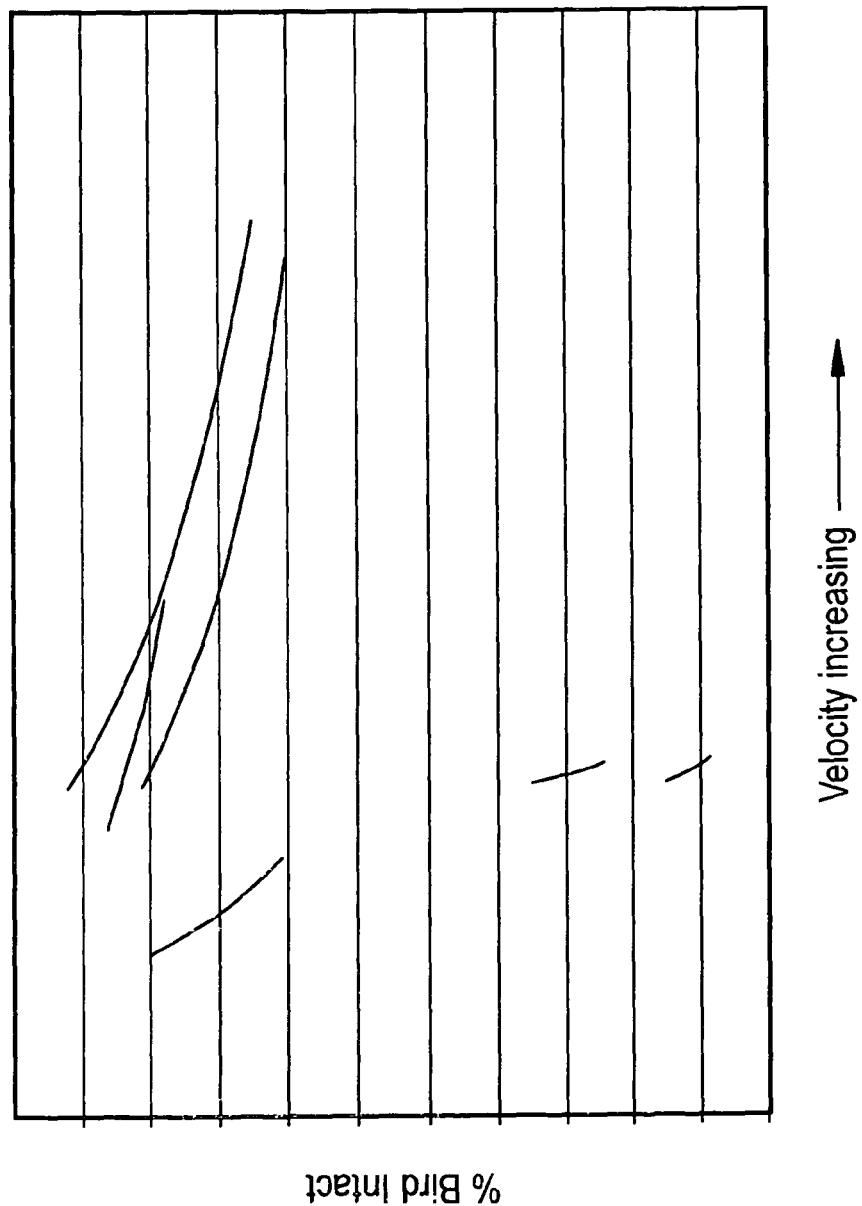

CHARACTERISATION OF SOFT BODY IMPACTS

BACKGROUND

This invention relates to the design of gas turbine engines, and more particularly to the characterization of bird impacts, which are a particular problem when such engines are used in aircraft.

Bird impacts can be very damaging to gas turbine engines, and it is necessary to design engines so that they can be safely run on for a period of time after an impact or, at the very least, safely shut down without causing danger to the aircraft or passengers.

The basic techniques for carrying out bird ingestion tests on gas turbine engines are well known, and need not be discussed in detail here.

In such a test, a soft body is fired at a known position on the inlet of the engine. The soft body may be either a dead bird or an artificial soft body designed to replicate closely the impact behavior of a real bird. Such artificial soft bodies are well known. In the following description, the term "bird" can generally be taken to refer either to a real bird or to an artificial soft body used in a test in place of a real bird. After an impacting bird first hits the structure of the engine (whether static or rotating structure) it will fragment. Damage may be caused to the downstream parts of the engine by these fragments, and the size and trajectories of the fragments will determine the extent of this damage. Normally, the fragmentation can be assessed by viewing photographs or video of the first impact. The observed fragmentation can then be used to model the behavior of the different parts of the engine following an impact, and thereby to design the engine to minimize damage from bird strikes.

SUMMARY

However, there is a problem when an engine is fitted with an obscuring intake. Such intakes are commonly used on military engines, so that the structure of the intake shields the hot components of the engine and prevents its detection by radar or other systems. The problem is that an incoming bird will strike the surface of the intake and will fragment, but the fragments are then hidden within the intake and so it is not possible to assess their size and trajectories. To obtain an initial bird condition for analysis, it is necessary to perform a separate impact test for each impact condition. This is time-consuming and expensive.

Previously, impact analyses have been undertaken using a whole, intact bird, a bird fragment or a non-validated slurry.

For the analysis of the bird strike capabilities of engines that will in use be shielded by an obscuring intake, it is vital that the initial conditions of the bird, which are used for analysis, reflect reality. Following a light impact of a bird on the intake, the bird can be modeled as a single fragment whose mass corresponds to that of the largest bird fragment. Following a severe impact, the bird can be modeled as a slurry. In between these two extremes of impact, the bird can be modeled as a combination of fragment(s) and slurry.

There has previously been no method, other than an actual test, to predict what size bird fragment to use for analysis or what the initial conditions and composition of the slurry should be.

The invention provides a method for characterizing the fragmentation of a bird following impact with a surface. Because the method allows prediction of how much a bird is likely to break up under different conditions, fewer or no actual bird impact tests are required before the engine modeling can be performed.

BRIEF DESCRIPTION OF THE DRAWINGS

Embodiments of the invention will now be described, by way of example, with reference to the drawings in which

FIG. 2 is a graph of size of largest fragment against mass of bird;

FIG. 3 is a graph of size of largest fragment against impact angle;

FIG. 4 is a graph of size of largest fragment against velocity of impact;

DETAILED DESCRIPTION OF EMBODIMENTS

Bird impact tests have previously been carried out to characterize the behavior of birds after an angled impact on a target plate. In these tests, and the subsequent modeling, it was assumed that, after the impact, the bird could be modeled as a slurry. This approach proved successful for modeling tests with a high impact speed, in which the component of the bird's velocity normal to the target plate was large. However, analysis of high-speed video of these tests showed that as the normal velocity of the bird on to the target plate decreased, more and more of the bird remained intact. The slurry model for the bird behavior was clearly inadequate.

The inventors therefore conducted a number of bird impact tests to determine the extent of fragmentation under different conditions. A special apparatus was used to enable the fragments to be recovered undamaged. The masses of the fragments could then be determined.

Figure 1:
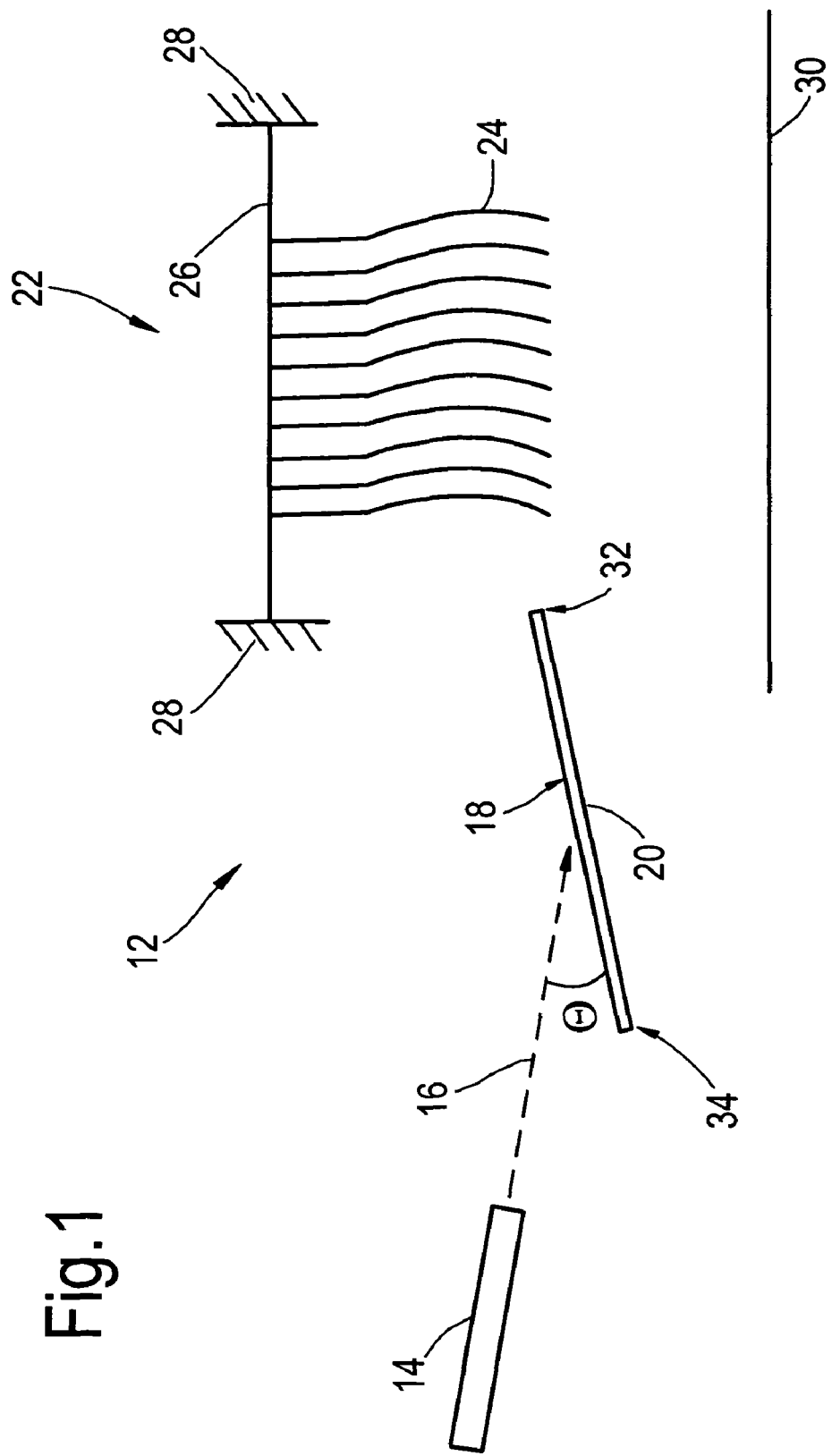
FIG. 1 is a schematic illustration of the test apparatus.

FIG. 1 is a schematic illustration of the test apparatus 12. A gun 14 of known type fires a bird (not shown) along a trajectory 16 to impact on a surface 18 of a target 20. The angle of impact of the bird on the surface 18 is θ. The fragmented bird is deflected off the surface towards a soft-recovery system 22. This comprises a number of large plastic sacks 24 freely suspended on two parallel ropes 26 (only one is visible). The ropes 26 are rigidly fixed at their ends to structure 28. In this embodiment, ten sacks 24 are used, but any suitable number may be employed. The sacks 24 absorb energy from the bird fragments without damaging them, allowing them to fall on to a sheet 30 on the floor for collection and analysis.

High-speed video was used to record each test, and a picture of the target 20 was taken after each test. The extent of the splatter pattern on the target gives an indication of the spread of broken bird pieces from the impact site.

After each test, the bird fragments were collected and laid out for measurement. The largest fragments were weighed and measured, the number of fragments was counted and the total mass recovered was measured.

The following parameters were varied during the tests to assess their effect on the fragmentation of the birds—impact angle (θ between 4 and 55 degrees); mass of bird (between about 3.5 oz (0.1 kg) and about 8 lb (3.6 kg); rigidity of surface; and velocity of impact (between about 50 knots (25.7 m/s) and 500 knots (257.4 m/s)).

Two standards of target plate were used in these tests. The "flexible" plate was a grade 316 stainless steel plate approximately 4 mm thick, with dimensions between the supports of 500 mm wide and 700 mm long. This plate was restrained at its top 32 and bottom 34 edges only, leaving the side edges unrestrained. The "rigid" plate was a mild steel plate 25 mm thick, 1000 mm long and 800 mm wide. This plate was firmly clamped around its whole circumference to a massive support.

Graphing the fragment properties against the input conditions, for the different values of these parameters, has allowed the inventors to derive mathematical relationships that will predict the post-impact fragmentation of a bird.

FIG. 2 shows the relationship between bird mass and the size of the largest fragment after impact. Tests were carried out on birds with masses between about 3.5 oz (0.1 kg) and about 8 lb (3.6 kg), and the size of the largest fragment (as a percentage of the bird mass) was graphed against bird mass. These tests were performed with impact velocities of between about 78 knots (40 m/s) and about 486 knots (250 m/s). It was observed that there was a general trend for the proportional size of the largest fragment to increase with increasing bird mass.

FIG. 3 shows the relationship between angle of impact and the size of the largest fragment after impact. Tests were carried out with both rigid and flexible targets, and with angles of impact between about 5 degrees and about 55 degrees, and the size of the largest fragment (as a percentage of the bird mass) was graphed against angle of impact. These tests were performed with impact velocities of between 40 m/s and 250 m/s. It was observed that there was a general trend for birds to break up less on flexible targets than on rigid targets.

FIG. 4 shows the relationship between impact velocity and the size of the largest fragment after impact. Tests were carried out with birds of different weights, different impact angles and both flexible and rigid targets. The tests were performed with impact velocities between about 40 m/s and about 250 m/s. It was observed that there was a general trend for birds to break up more at higher velocity (that is, the proportional size of the largest fragment tends to decrease with increasing impact velocity).

The information presented so far concerns the modeling of bird fragments. As outlined above, it is appropriate to model the bird's fragmentation purely in terms of fragments for relatively light impacts. For more severe impacts, it is also necessary to model the behavior of a slurry, and this will now be explained in more detail.

Impact tests were conducted in which a bird was fired at an angled target plate. This target plate was mounted on lateral sliding roller rails, which in use allow the target plate to move almost without friction. In use, when a bird strikes the target plate, the transfer of momentum causes the target plate to move along the roller rails. By measuring the distance moved, and the velocity of the target plate's movement, the quantity of momentum transferred can be measured.

The apparatus also included a splitter, a vertical plate designed to replicate an engine fan blade. The splitter was also mounted on lateral sliding roller rails, so that momentum transfer could be calculated for any debris striking it. A catcher box, likewise mounted on lateral sliding roller rails, was also provided to receive the fragments of each bird.

After a bird impact on a target plate, the slurry tends to leave the plate in a diverging, cone-shaped trajectory. The slurry leaves a roughly triangular trail on the target plate. Video images of the target plates were analyzed, and trigonometry was used to calculate the angle of divergence of the slurry as it leaves the plate.

The results of these calculations were then used to set boundary conditions in a computational model of the splitter and catcher box. A commercially available finite element analysis program was used for the computational model. The intention of this modeling was to find a definition for a slurry model that would reproduce the displacements and velocities of the splitter and catcher box observed during the actual tests.

Figure 5A:
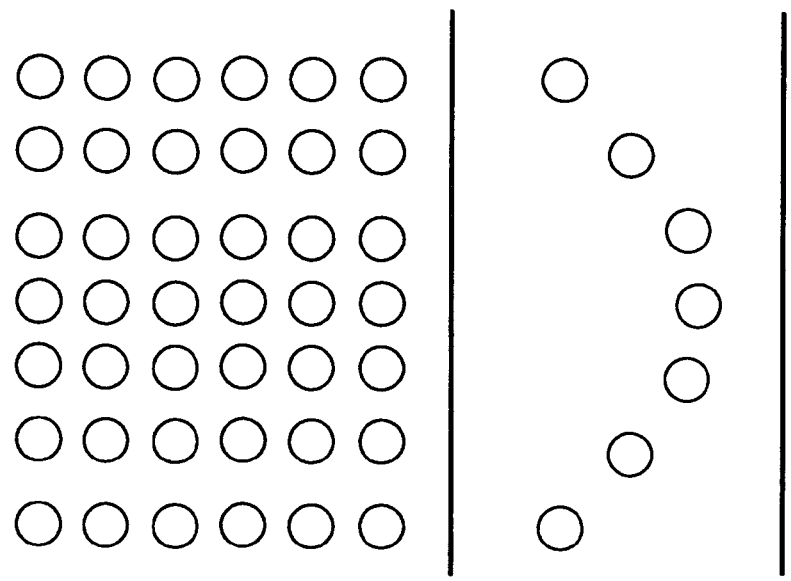
FIGS. 5a and 5b show schematically two arrangements of spheres in a computational model of a slurry.
Figure 5B:
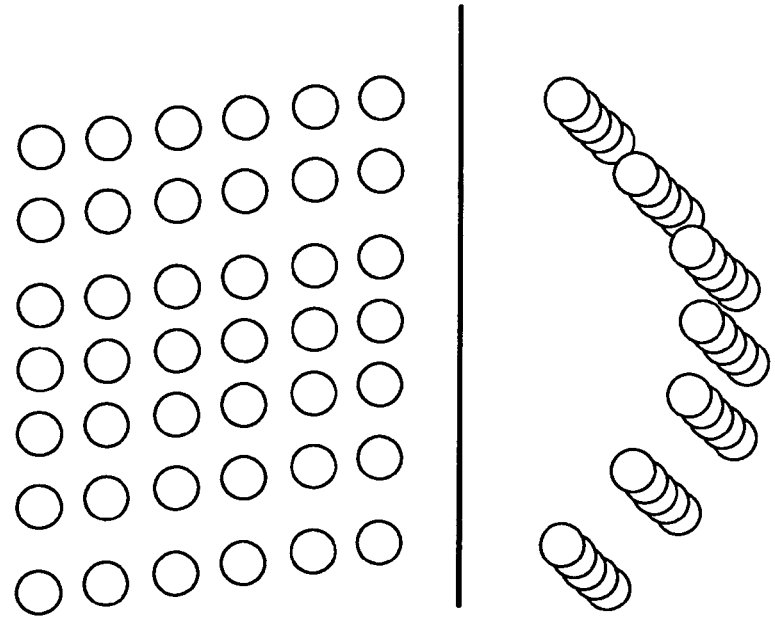

Initially, the slurry model comprised a large number of spheres of about 0.5 g each, arranged in several sections of square matrix. FIG. 5a shows a part of this model. This model gave a splitter velocity far lower than had been seen in the actual tests. It was observed that it was possible for the splitter to pass between two adjacent rows of balls, and so the model was adjusted to offset successive rows of balls, as shown in FIG. 5b. This did increase the velocity of the splitter, but not to the level that was measured in the experiments.

The model was modified in several ways to try to reproduce the splitter velocity seen in the tests. The slurry was made more compact; the balls were made larger; and solid, rather than hollow, balls were used.

The catcher box velocity observed in the computational analyses was initially far higher than was seen in the actual tests. It was concluded that this was caused by two effects—firstly, the conditions of the slurry that achieve the optimum momentum transfer into the splitter velocity will tend to transfer too much momentum into the catcher box; secondly, actual slurry diverges whereas the modeled slurry did not, so too much slurry was hitting the catcher. To overcome this problem, the slurry was first modified by progressively reducing the diameter of the spheres, from 8 mm in the centre down to 1 mm at the edges of the slurry.

Figure 6:
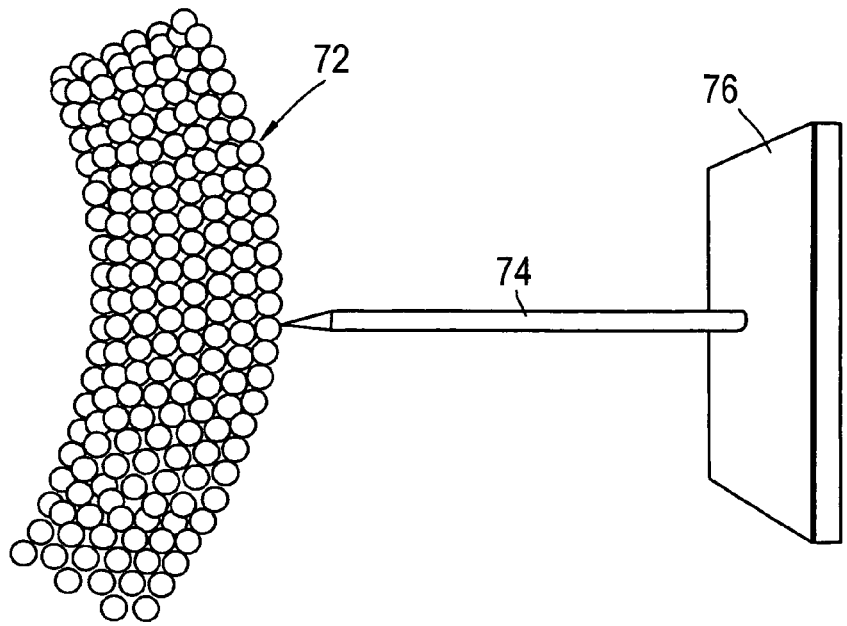
FIG. 6 shows the initial computational model of the slurry.

FIG. 6 shows the slurry modeled by spheres 72 of uniform size, and also shows the modeled representations of the splitter 74 and catcher box 76.

Figure 7:
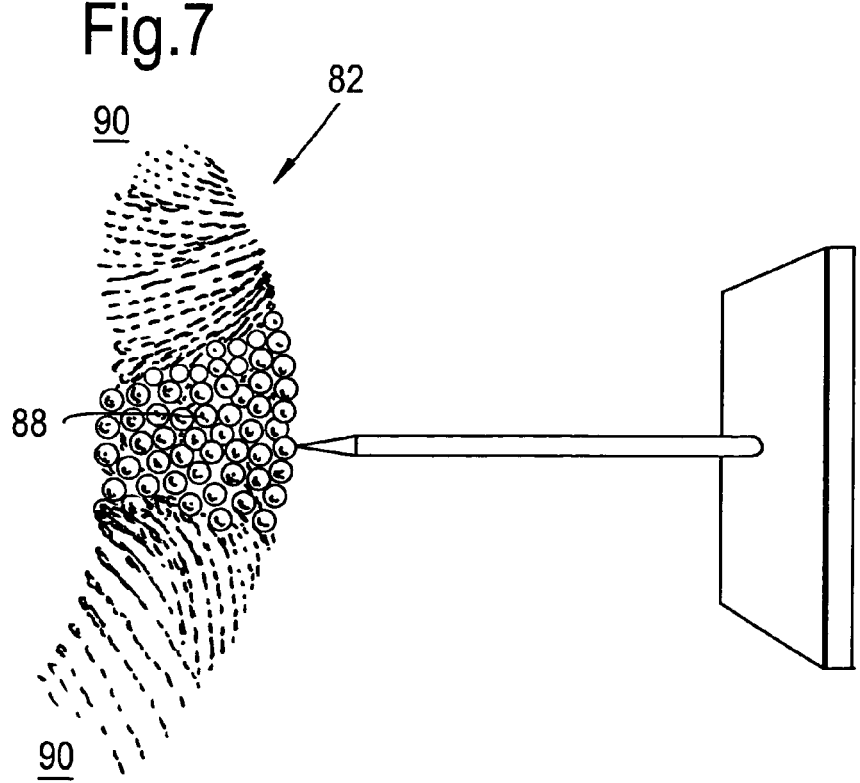
FIG. 7 shows the modified computational model of the slurry.

FIG. 7 shows the modified slurry, modeled by spheres 82 whose size reduces progressively from the centre 88 to the periphery 90 of the slurry.

This modification improved the accuracy of the catcher box velocity, and a further improvement was obtained by giving the spheres a diverging trajectory.

It will be appreciated that alternative embodiments of the invention are possible, besides those described.

In particular, it will be appreciated that the invention can be used in any application in which a bird or other similar soft body is in collision with a stationary surface, and in which it is desirable to understand the behavior of the system after the collision.

The invention claimed is:

1. A finite element computation model method for characterizing fragmentation of a soft body following impact with a surface, comprising the steps of:
   obtaining values for a mass and a velocity of the soft body;
   obtaining a value for an impact angle of the soft body on the surface;
   obtaining a value for stiffness of the surface;
   processing the obtained values to generate parameters characterizing the fragmentation of the soft body, in which:
      the generated parameters define at least one fragment and at least one slurry,
      the slurry is defined by a plurality of spheres, and
      the spheres defining the slurry are larger near its centre and smaller near its periphery.

2. The method as claimed in claim 1, in which the generated parameters comprise fragment mass and initial trajectory for at least one fragment.

3. The method as claimed in claim 1, in which the surface is part of a gas turbine engine.

4. The method as claimed in claim 3, in which the surface is part of an obscuring intake.

5. The method as claimed in claim 1, in which mass of the slurry is concentrated near its centre.

6. The method as claimed in claim 1, in which the spheres defining the slurry have a diverging trajectory.

7. A finite element computation model method for characterizing fragmentation of a soft body following impact with a surface, comprising the steps of:

obtaining values for a mass and a velocity of the soft body;

obtaining a value for an impact angle of the soft body on the surface;

obtaining a value for stiffness of the surface;

processing the obtained values to generate parameters characterizing the fragmentation of the soft body, in which:

the generated parameters define at least one fragment and at least one slurry, the slurry is defined by a plurality of spheres, and in which the spheres defining the slurry are arranged in layers of differently sized spheres.

* * * * *